> United States Patent Office 2,824,894
Patented Feb. 25, 1958

2,824,894

HYDROXYETHYL-PHENOXYBENZYL-DICHLOROACETAMIDE

Willy Logemann and Luigi Almirante, Milan, Italy, assignors to Carlo Erba S. p. A., Milan, Italy No Drawing. Application July 13, 1956
Serial No. 597,595

Claims priority, application Italy July 22, 1955

1 Claim. (Cl. 260—562)

Some aromatic organic compounds, substituted in the ring with halogen atoms, have found wide use as antiprotozoa agents: among others the 7-iodo-8-hydroxyquinolino-5-sulfonic acid, the 5-7-diiodo-8-hydroxyquinoline and the 7-chloro-4(1'-methyl-4'-diethylaminobutylamino)-quinoline.

On the grounds of our studies we now have found a group of substances with high activity which do not contain halogen atoms in the aromatic ring.

The general formula of these compounds is:

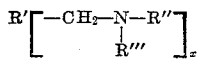

where R' can be an aromatic radical, simple or with condensated rings, also partially hydrogenated, or a hydroaromatic, heterocyclic radical or constituted of further aromatic rings bound between themselves with oxygen or sulfur atoms where said aromatic rings are unsubstituted or substituted with groups like —$NO_2$, halogens, —$NH_2$, —OH, —COOH and others; R'' can be hydrogen or a lower alkyl radical, simple or substituted: in this case the substituents may be the groups —OH, —SH, —S-alkyl or basic groups as —$N(alkyl)_2$ whenever bound in the chain; R''' can be an acid radical as —CO-alkyl with halogenated substituents in the alkyl group whenever arranged in the chain. In the general formula x can be 1 or 2.

The methods we indicate for the preparation of these compounds are:

(1) An aldehyde as R'—CHO (R', R'', R''' have the same meaning as above) is condensated with an amine as R''—$NH_2$ and the resulting base of Schiff submitted to a catalytic hydrogenation. The secondary amine thus obtained is reacted with an acylating agent, substituted with halogens in the alkyl radical. Anhydrides, chlorides and esters of organic aliphatic acids containing one or more halogens in the alkyl radical can be used or the pentachloroacetone.

(2) An alkyl halogenide as R'—$CH_2$-halogen is reacted with an amine as R''—$NH_2$, directing the reaction in order to obtain a secondary amine like

R'—$CH_2$—NH—R'' which is then acylated according to (1).

(3) A mole of amine as R'—$CH_2$—$NH_2$ is reacted with a mole of an alkylene oxide as for example the ethylene or propylene oxide or with an alkyl halogenide as halogen-R'' and then the resulting secondary amine is acylated as described in (1).

These products show an interesting antiprotozoa activity.

The process is shown, but not limited by the following examples:

Example 1

15 g. of β-chloromethyl-5,6,7,8-tetrahydronapthalene are added slowly to 20 g. of monoethanolamine without exterior cooling for 4 hours. The solution is then left at room temperature for a night. The obtained syruplike mass is poured into ice and extracted with ether. The ether is carefully washed with water, dried and distilled. The remaining oil is rectified under vacuum: the so obtained N-(β-hydroxyethyl)-N-(β-methyl-tetrahydronaphthalene)-amine is dichloroacetylated, adding it to 15 g. of methyl dichloroacetate and maintaining the mixture under strong stirring for 4 hours at 60° C. After having left the whole for a night at room temperature, the mixture is re-treated with diluted hydrochloroic acid and extracted with ether: through evaporation of the solvent the N-(β-hydroxyethyl)-N-(β-methyl-tetrahydronaphthalene)-dichloroacetamide (M. 110–112° C.) is obtained.

Example 2

15 g. of 4-chloromethyl-diphenylether are added slowly to 20 g. of monoethanolamine in the course of 2 hours. The solution is left for a night at room temperature, retreated with ice-water and extracted with benzene. After having carefully washed the solvent with water it is dried and the base is precipitated with a stream of gaseous hydrochloric acid. The so obtained hydrochloride is solved in water and is made alkaline with ammonia. The formed oil is separated, dried with calcium chloride and dichloroacetylated directly by solving it in 50 cc. of methanol and adding 15 cc. of pentachloroacetone. The solution is refluxed for 3 hours. Through evaporation of the solvent the N-(β-hydroxyethyl)-N-(p-phenoxybenzyl)-dichloroacetamide is obtained.

Example 3

30 g. of p-phenoxy-(4'-nitro)-benzylchloride are added under stirring to a chloroformic solution of 27 g. of monoethanolamine. After refluxing the solution for 2 hours the chloroform is carefully washed with water and extracted with diluted hydrochloric acid. By making alkaline with ammonia the N-(β-hydroxyethyl)-N-[p-phenoxy-(4'-nitro)-benzyl]-amine (M. 58–60° C.) is precipitated. Through dichloroacetylation with the common dichloroacetylating agents and with pentachloroacetone, the N-(β-hydroxyethyl)-N-[p-phenoxy-(4'-nitro)-benzyl]-dichloroacetamide (M. 134–135° C.) is obtained.

Example 4

The N-(β-hydroxyethyl)-N-[p-phenoxy-(4'-nitro)-benzyl]-amine, synthesized according to Example 3, is reduced in autoclave with Ni-Raney in alcoholic solution. Through evaporation of the solvent the N-(β-hydroxyethyl)-N-[p-phenoxy-(4'-amino)-benzyl]-amine is obtained which is dichloroacetylated with methyl dichloroacetate according to Example 1.

We claim:
N - (β - hydroxyethyl) - N - [p - phenoxy - (4' - nitro)-benzyl]-dichloroacetamide:

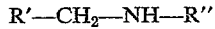

References Cited in the file of this patent

UNITED STATES PATENTS

| 2,721,212 | Black | Oct. 18, 1955 |
| 2,732,402 | Surrey | Jan. 24, 1956 |
| 2,771,468 | Surrey | Nov. 20, 1956 |